United States Patent
Liu et al.

(10) Patent No.: US 9,927,911 B2
(45) Date of Patent: Mar. 27, 2018

(54) TOUCH DISPLAY PANEL AND FABRICATION METHOD THEREOF, AND TOUCH DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Xiaoliang Ding, Beijing (CN); Shengji Yang, Beijing (CN); Weijie Zhao, Beijing (CN); Hongjuan Liu, Beijing (CN); Liguang Deng, Beijing (CN); Huizhong Zhu, Beijing (CN); Changfeng Li, Beijing (CN); Wei Liu, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/115,945

(22) PCT Filed: Jan. 29, 2016

(86) PCT No.: PCT/CN2016/072824
§ 371 (c)(1),
(2) Date: Aug. 2, 2016

(87) PCT Pub. No.: WO2017/004986
PCT Pub. Date: Jan. 12, 2017

(65) Prior Publication Data
US 2017/0185208 A1    Jun. 29, 2017

(30) Foreign Application Priority Data

Jul. 9, 2015    (CN) .......................... 2015 1 0400775

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2014/0048854 A1* 2/2014 Wang .................... G06F 3/0412
                                                                  257/254

FOREIGN PATENT DOCUMENTS

CN    102841716 A    12/2012
CN    102866815 A    1/2013
(Continued)

OTHER PUBLICATIONS

Search Report and Written Opinion dated Mar. 24, 2016 from State Intellectual Property Office of the P.R. China.

*Primary Examiner* — Patrick Edouard
*Assistant Examiner* — Douglas M Wilson
(74) *Attorney, Agent, or Firm* — Dilworth & Barrese, LLP.; Michael J. Musella, Esq.

(57) ABSTRACT

A touch display panel, a fabrication method thereof, a touch display apparatus are provided. The touch display panel includes touch driving electrodes touch driving electrode wires touch driving electrode connection wires. Each column of touch driving electrodes include touch driving (Continued)

electrode blocks, each of the touch driving electrode blocks which is connected with one touch driving electrode wire, different columns of touch driving electrode blocks are connected with different touch driving electrode wires. Each of the touch driving electrode blocks includes a plurality of interruptedly distributed touch driving electrode units that are electrically connected by the touch driving electrode connection wires. An orthogonal projection of the touch driving electrode wire connected with corresponding touch driving electrode block on the array substrate does not overlap with orthogonal projections of the touch driving electrode units of the touch driving electrode blocks other than the corresponding touch driving electrode block on the array substrate.

16 Claims, 6 Drawing Sheets

(56) References Cited

FOREIGN PATENT DOCUMENTS

| CN | 202711227 U | 1/2013 |
|---|---|---|
| CN | 202736016 U | 2/2013 |
| CN | 103049155 A | 4/2013 |
| CN | 104049799 A | 9/2014 |
| CN | 104898892 A | 9/2015 |

* cited by examiner

TOUCH DISPLAY PANEL AND FABRICATION METHOD THEREOF, AND TOUCH DISPLAY APPARATUS

TECHNICAL FIELD

Embodiments of the present disclosure relate to a touch display panel and a fabrication method thereof, and a touch display apparatus.

BACKGROUND

Along with rapid development of display technology, touch display panel has been gradually spread all over people' lives. Compared with a conventional display which only provides a display function, a display using the touch display panel enables information interaction to be carried out between a user and a display control host, and thus, the touch display panel can completely or at least partially replace a common input apparatus and the display not only can display but also can achieve touch control. Currently, the most widely applied touch display panels are capacitive touch display panels, and the capacitive touch display panels, according to a relative relationship of touch electrodes with a Thin Film Transistor (TFT) array substrate and a Color Filter (CF) substrate, are divided into three types of in-cell, on-cell and add-on. The in-cell capacitive touch display panel is an important development direction of the touch technology due to its advantages of high integration level, small thickness, superior performance and the like.

Figure 1:
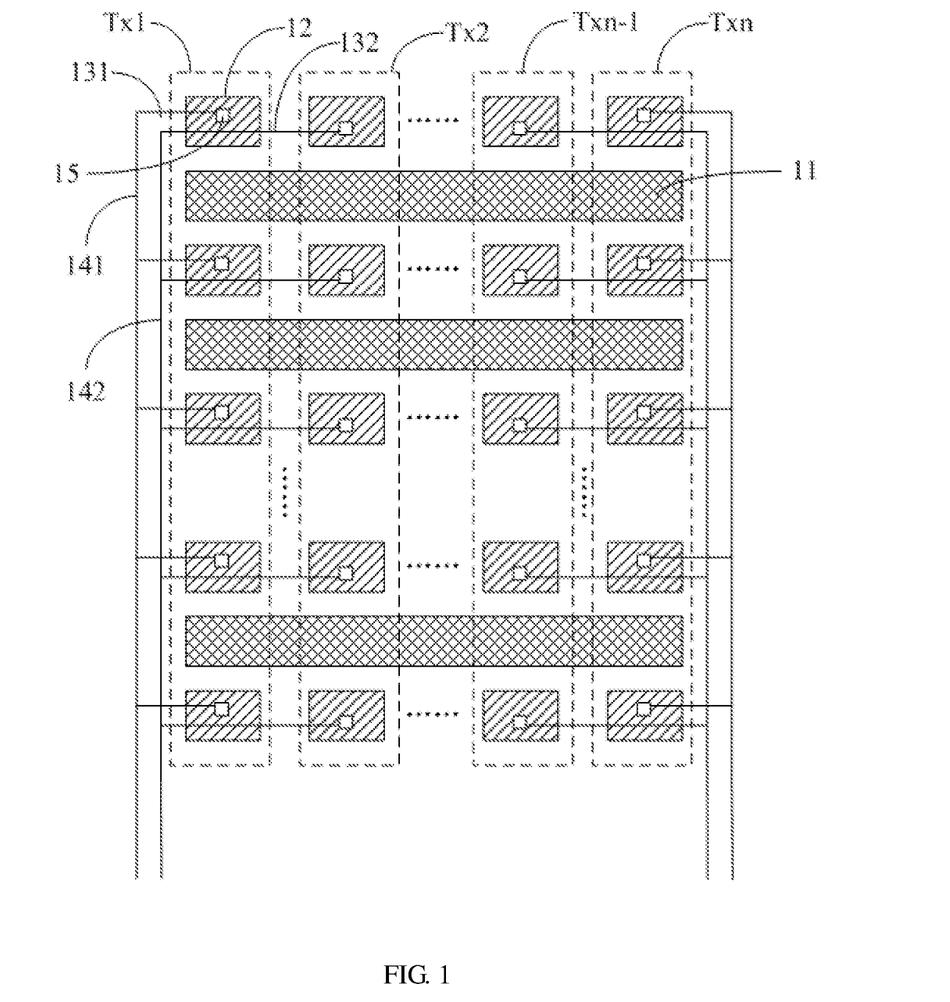
FIG. 1 is a planar structural schematic view illustrating a touch display panel according to one technique.

In the in-cell capacitive touch display panel, touch driving electrodes Tx are arranged on the array substrate, touch sensing electrodes Rx are arranged on the color filter substrate facing the array substrate, and an arrangement direction of the touch driving electrodes Tx is perpendicular to an arrangement direction of the touch sensing electrodes Rx. FIG. 1 shows a structure of a common electrode layer on the array substrate. The common electrode layer includes two parts: common electrodes 11 are used as permanent common electrodes, other common electrodes than the common electrodes 11 in the common electrode layer are further used as the touch driving electrodes in a touch stage, and the common electrodes further used as the touch driving electrodes are electrode blocks 12 which are discontinuously and interruptedly distributed. Each electrode block 12 is connected with a metal wire through a via hole 15, the metal wires are produced in a same layer as gate electrodes, all the metal wires extend to a peripheral lead region of the array substrate, the metal wires connected with a same column of electrode blocks 12 are connected together through a lead in the peripheral lead region; in this way, the touch driving electrodes are formed. The metal wires are wires distributed in a horizontal direction in the diagram, and the leads are wires distributed in a vertical direction in the diagram. For example, the metal wires 131 connected with a first column of electrode blocks 12 are connected together through the lead 141 in the peripheral lead region to form the touch driving electrode Tx1, and the metal wires 132 connected with a second column of electrode blocks 12 are connected together through the lead 142 in the peripheral lead region to form the touch driving electrode Tx2.

For the touch display panel as described above, in the touch stage, the metal wires of the inside touch driving electrodes will cross the electrode blocks of the outside touch driving electrodes, e.g., the metal wires 132 in the touch driving electrode Tx2 cross the electrode blocks 12 in the touch driving electrode Tx1; thus, in the case that touch scanning is carried out on the inside touch driving electrodes, the outside touch driving electrodes suffers from a crosstalk, thereby influencing touch uniformity of the touch display panel. In addition, if the lead 141 for the touch driving electrode Tx1 and the lead 142 for the touch driving electrode Tx2 are produced in a same layer, a short circuit may occur therebetween; thus, in the actual producing process, the lead 141 and the lead 142 need to be produced in different layers, or the lead 141 and the lead 142 are produced in the same layer and insulation treatment needs to be carried out at a crossing position of the lead 141 and the lead 142.

Accordingly, the touch display panel is easy to generate the crosstalk in the touch stage, and the touch display panel is poor in touch uniformity.

SUMMARY

According to embodiments of the disclosure, a touch display panel is provided. The touch display panel comprises an array substrate and an opposite substrate which are arranged to face each other, and the opposite substrate includes a plurality of touch sensing electrodes distributed in a row direction. The array substrate includes a plurality of touch driving electrodes distributed in a column direction, a plurality of touch driving electrode wires distributed in the row direction, and a plurality of touch driving electrode connection wires which are distributed in the column direction and are insulated from the touch driving electrode wires. Each column of touch driving electrodes include a plurality of touch driving electrode blocks, each of the touch driving electrode blocks is connected with one touch driving electrode wire, and different columns of touch driving electrode blocks are connected with different touch driving electrode wires. Each of the touch driving electrode blocks includes a plurality of interruptedly distributed touch driving electrode units, and the touch driving electrode units of each of the touch driving electrode blocks are electrically connected by the touch driving electrode connection wires. An orthogonal projection of the touch driving electrode wire connected with corresponding touch driving electrode block on the array substrate does not overlap with orthogonal projections of the touch driving electrode units of other touch driving electrode blocks than the corresponding touch driving electrode block on the array substrate.

For example, the array substrate includes a base substrate, and the touch driving electrodes, gate lines, a gate insulating layer, a semiconductor active layer, source and drain electrodes, a passivation layer and pixel electrodes which are sequentially positioned on the base substrate; and the touch driving electrodes are driven in a time-division manner, so that the touch driving electrodes are configured as common electrodes inputted common electrode signals in a display stage and the touch driving electrodes are inputted touch driving signals in a touch stage.

For example, the touch driving electrode wires and the gate lines are provided in a same layer.

For example, each of the touch driving electrode blocks is connected with one touch driving electrode wire, which includes: part of the touch driving electrode units of each of the touch driving electrode blocks is directly in contact with one of the touch driving electrode wires.

For example, the touch driving electrode connection wires and the pixel electrodes are provided in a same layer.

For example, the touch driving electrode units of each of the touch driving electrode blocks are electrically connected by the touch driving electrode connection wires, which includes: the touch driving electrode connection wires electrically connect the touch driving electrode units of each of the touch driving electrode blocks through via holes running through the gate insulating layer and the passivation layer.

For example, the touch driving electrode units of each column of the touch driving electrode blocks are same in size.

For example, the touch driving electrode units of different columns of the touch driving electrode blocks are same in size.

According to the embodiments of the disclosure, a touch display apparatus is provided. The touch display apparatus comprises the touch display panel as described above.

According to the embodiments of the disclosure, a fabrication method of a touch display panel is provided. The method comprises a method of producing an array substrate and a method of producing an opposite substrate. The method of producing the opposite substrate includes: producing a plurality of touch sensing electrodes distributed in a row direction on the opposite substrate. The method of producing the array substrate includes: producing a plurality of touch driving electrodes distributed in a column direction on a base substrate, each column of the touch driving electrodes including a plurality of touch driving electrode blocks, and each of the touch driving electrode blocks including a plurality of interruptedly distributed touch driving electrode units; producing a plurality of touch driving electrode wires distributed in the row direction on the base substrate, each of the touch driving electrode blocks being connected with one of the touch driving electrode wires, different columns of touch driving electrode blocks are connected with different touch driving electrode wires, and an orthogonal projection of the touch driving electrode wire connected with corresponding touch driving electrode block on the array substrate not overlapping with orthogonal projections of the touch driving electrode units of other touch driving electrode blocks than the corresponding touch driving electrode block on the array substrate; and producing a plurality of touch driving electrode connection wires which are distributed in the column direction and are insulated from the touch driving electrode wires on the base substrate, the touch driving electrode units of each of the touch driving electrode blocks being electrically connected by the touch driving electrode connection wires.

For example, the method of producing the array substrate includes: producing the plurality of touch driving electrodes distributed in the column direction on the base substrate by a patterning process, the touch driving electrodes being driven in a time-division manner so that the touch driving electrodes being configured as common electrodes inputted common electrode signals in a display stage and the touch driving electrodes being inputted touch driving signals in a touch stage; producing gate electrodes, gate lines and the touch driving electrode wires in a same layer by a patterning process on the base substrate, the touch driving electrode wires being in parallel to the gate lines; sequentially producing a gate insulating layer, a semiconductor active layer, source and drain electrodes, a passivation layer and via holes running through the gate insulating layer and the passivation layer by a patterning process on the base substrate; and producing pixel electrodes and the touch driving electrode connection wires in a same layer by a patterning process on the base substrate, the touch driving electrode connection wires connecting the touch driving electrode units of each of the touch driving electrode blocks through the via holes.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Thicknesses, sizes and shapes of respective thin films in the drawings do not reflect a true scale of respective film layers, and only aims to schematically illustrate contents of the present disclosure.

A touch display panel according to the embodiments of the present disclosure will be illustrated in detail in connection with the drawings in the following.

Figure 2:
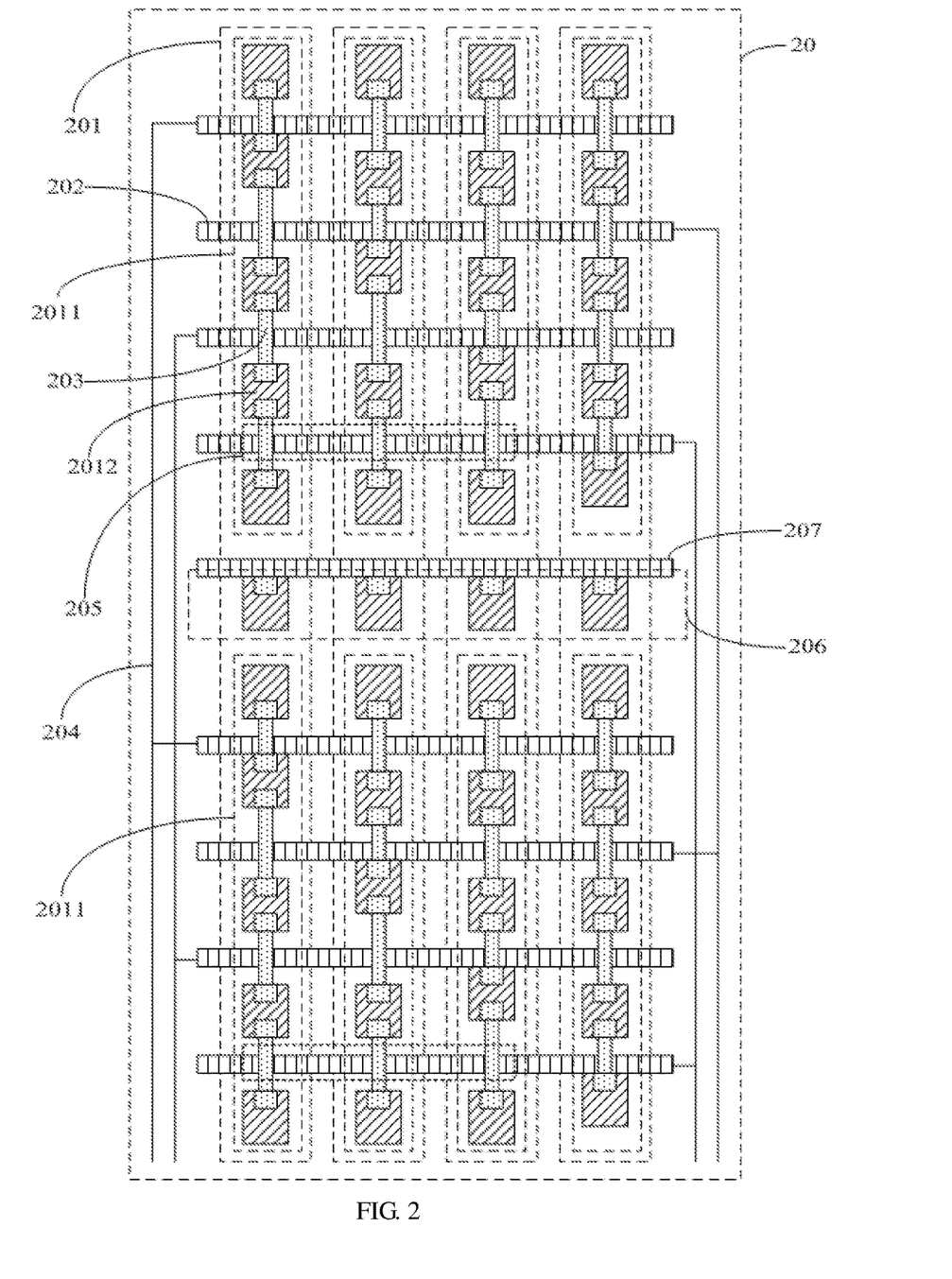
FIG. 2 is a planar structural schematic view illustrating a touch display panel according to embodiments of the present disclosure.

As shown in FIG. 2, the embodiments of the present disclosure provide the touch display panel, comprising an array substrate 20 and an opposite substrate (not shown) which are arranged to face each other. The opposite substrate includes a plurality of touch sensing electrodes distributed in a row direction, and the touch sensing electrodes are arranged in regions corresponding to black matrixes which are transversely distributed or the touch sensing electrodes are arranged in regions corresponding to black matrixes which are longitudinally distributed. The embodiments of the present disclosure do not limit specific arrangement of the touch sensing electrodes.

The array substrate 20 includes a plurality of touch driving electrodes 201 distributed in a column direction, a plurality of touch driving electrode wires 202 distributed in the row direction, and a plurality of touch driving electrode connection wires 203 which are distributed in the column direction and are insulated from the touch driving electrode wires 202. For example, the row direction in the embodiments of the present disclosure is a horizontal direction, and the column direction is a vertical direction. Alternatively, for example, the row direction is the vertical direction and the column direction is the horizontal direction, as long as it is guaranteed that the touch sensing electrodes and the touch driving electrodes cross each other (e.g., perpendicular to each other).

Each column of touch driving electrodes 201 include a plurality of touch driving electrode blocks 2011, each of the touch driving electrode blocks 2011 is connected with one touch driving electrode wire 202, and different columns of touch driving electrode blocks 2011 are connected with different touch driving electrode wires 202.

Each of the touch driving electrode blocks 2011 includes a plurality of interruptedly distributed touch driving electrode units 2012, and the touch driving electrode units 2012 of each of the touch driving electrode blocks 2011 are electrically connected by the touch driving electrode connection wires 203.

An orthogonal projection of the touch driving electrode wire 202 connected with corresponding touch driving electrode block 2011 on the array substrate does not overlap with orthogonal projections of the touch driving electrode units 2012 of other touch driving electrode blocks 2011 than the corresponding touch driving electrode block 2011 on the array substrate.

For example, the touch driving electrode wires 202 distributed in different rows are all led out by respective leads 204 positioned in a peripheral lead region of the array substrate, the leads 204 are subsequently connected with a touch driving apparatus (not shown) produced on the array substrate, and an operation principle and design of the touch driving apparatus are not limited herein. For example, the touch driving electrode wires 202 distributed in different rows and connected with a same column of touch driving electrode 201 are led out by a same lead 204.

It can be seen from the drawing that the leads 204 connected with the touch driving electrode wires 202 are arranged in the peripheral lead region on both sides of the array substrate. Alternatively, for example, the leads 204 are arranged in the peripheral lead region on one side of the array substrate.

For example, in FIG. 2 of the embodiments of the present disclosure, an overlapping region 205 is formed between an orthogonal projection of the touch driving electrode wire 202 connected with a fourth column of touch driving electrode blocks 2011 and orthogonal projections of the touch driving electrode connection wires 203 of first three columns of touch driving electrodes 201, a parasitic capacitance is generated at a position of the overlapping region 205; due to existence of the parasitic capacitance, in the case that the fourth column of touch driving electrode 201 is subjected to touch scanning, the first three columns of touch driving electrodes 201 suffer from a crosstalk. The larger an area of the overlapping region 205 is, the higher the parasitic capacitance is; and the higher the parasitic capacitance is, the more severe the crosstalk which the first three columns of touch driving electrodes 201 suffer from is. Thus, for example, widths of both of the touch driving electrode wires 202 and the touch driving electrode connection wires 203 need to be set to be small; however, in the case that the widths of the touch driving electrode wires 202 and the touch driving electrode connection wires 203 are small, resistances will be correspondingly increased. Therefore, the widths of the touch driving electrode wires 202 and the touch driving electrode connection wires 203 are not set to be very small, and the widths of the touch driving electrode wires 202 and the touch driving electrode connection wires 203 need to be set according to an actual process condition.

Compared with the touch display panel in FIG. 1 that the metal wires of the inside touch driving electrodes cross the electrode blocks of the outside touch driving electrodes, the touch driving electrode wires 202 of the inside touch driving electrodes in the embodiments of the present disclosure do not cross the touch driving electrode units 2012 having large areas of the outside touch driving electrodes. Thus, in the embodiments of the present disclosure, in the case that the inside touch driving electrodes are subjected to touch scanning, the inside touch driving electrodes generate a lower crosstalk on the outside touch driving electrodes, so that a touch effect of the touch display panel is improved.

Figure 3:
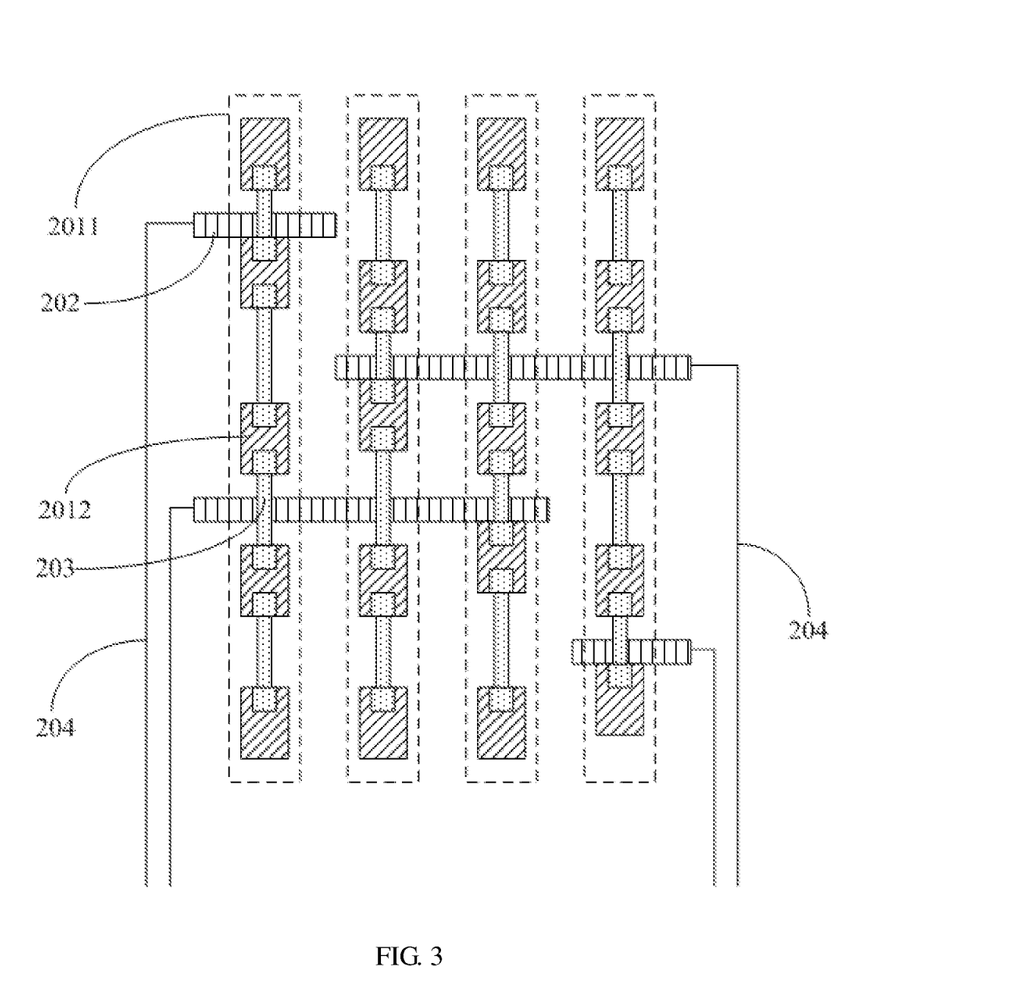
FIG. 3 is another planar structural schematic view illustrating the touch display panel according to the embodiments of the present disclosure.
Figure 4:
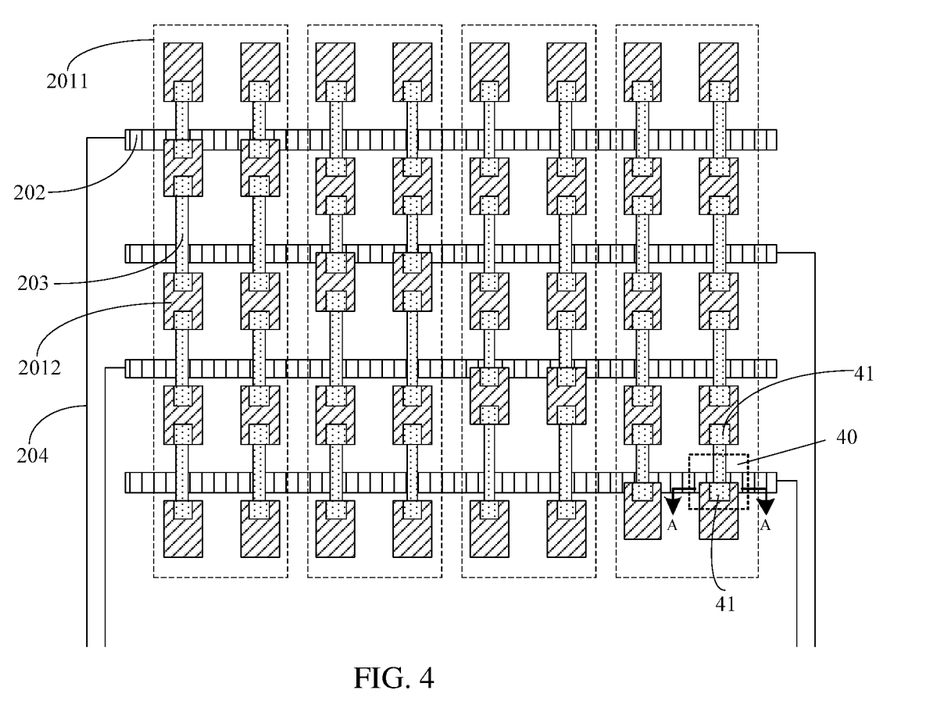
FIG. 4 is another planar structural schematic view illustrating the touch display panel according to the embodiments of the present disclosure.

FIG. 3 and FIG. 4 in the following show one touch driving electrode block 2011 of each column of touch driving electrodes in the column direction in the embodiments of the present disclosure.

For example, in the embodiments of the present disclosure, during the touch driving electrode wires 202 connected with the touch driving electrode blocks 2011 are designed, in order to further reduce crosstalk generated by the inside touch driving electrodes on the outside touch driving electrodes outside in the touch process, lengths of different touch driving electrode wires 202 in the horizontal direction are designed to be unequal, as shown in FIG. 3. Compared with FIG. 2, in FIG. 3, in the case that the fourth column of touch driving electrode blocks 2011 are subjected to touch scanning, the touch driving electrode wires 202 connected with the fourth column of touch driving electrode blocks 2011 do not cross the first three columns of touch driving electrode blocks 2011. Thus, in the case that the fourth column of touch driving electrode blocks 2011 are subjected to touch scanning, the fourth column of touch driving electrode blocks 2011 does not generate crosstalk on the first three columns of touch driving electrode blocks 2011.

For example, in the embodiments of the present disclosure, the touch driving electrode units 2012 of each column of touch driving electrode blocks 2011 are same in size, and the size of the touch driving electrode units 2012 is set according to requirements of actual production.

In order to improve production efficiency of producing the touch driving electrodes and improve touch uniformity of the touch display panel, for example, in the embodiments of the present disclosure, the touch driving electrode units 2012 of different columns of touch driving electrode blocks 2011 have the same size. In the actual production process, the size of each touch driving electrode unit 2012 is set to be the same as a size of each of sub-pixel units of the array substrate.

In the embodiments of the present disclosure, each column of touch driving electrode blocks 2011 for example includes one column of touch driving electrode units 2012 interruptedly distributed in the vertical direction, as shown in FIG. 2 and FIG. 3. In the actual design process, especially in the case that the size of each touch driving electrode unit 2012 is designed to be very small, each column of touch driving electrode blocks 2011 for example includes more than one column of touch driving electrode units 2012 interruptedly distributed in the vertical direction. As shown in FIG. 4, in the embodiments of the present disclosure, each column of touch driving electrode blocks 2011 include two columns of touch driving electrode units 2012 interruptedly distributed in the vertical direction.

For example, in the embodiments of the present disclosure, the array substrate includes a base substrate, and the touch driving electrodes, gate lines, a gate insulating layer, a semiconductor active layer, source and drain electrodes, a passivation layer and pixel electrodes which are sequentially positioned on the base substrate;

The touch driving electrodes are driven in a time-division manner, so that the touch driving electrodes are configured as common electrodes inputted common electrode signals in a display stage and the touch driving electrodes are inputted touch driving signals in a touch stage.

For example, in the embodiments of the present disclosure, part of the touch driving electrode units of the touch driving electrodes provided on the base substrate are configured as permanent common electrodes, i.e., the part of touch driving electrode units do not receive the touch driving signals in the touch stage, and the rest of the touch driving electrode units of the touch driving electrodes receive the touch driving signals in the touch stage. As shown in FIG. 2, for example, the touch driving electrodes at positions corresponding to orthogonal projection regions of the touch sensing electrodes of the opposite substrate, which are distributed in the row direction, on the array substrate, i.e., the touch driving electrode units 2012 in a region 206 in the diagram, are configured as the permanent common electrodes. The touch driving electrode units 2012 in the region 206 do not receive the touch driving signals in the touch stage; and the touch driving electrode units 2012 at other positions receive the touch driving signals in the touch stage. FIG. 2 only shows one permanent common electrode, the permanent common electrode is connected with a common electrode wire 207. For example, the common electrode wire 207 and the touch driving electrode wires 202 are arranged in the same layer. For example, the permanent common electrodes and the touch driving electrodes 201 are arranged in the same layer. For example, the permanent common electrodes and the touch driving electrodes 201 are simultaneously formed by the same patterning process performed on the same conductive film layer. For example, the common electrode wires 207 and the touch driving electrode wires 202 are arranged in the same layer; and for example, the common electrode wires 207 and the touch driving electrode wires 202 are simultaneously formed by the same patterning process performed on the same conductive film layer.

For example, the common electrodes further used as the touch driving electrodes are driven in the time-division manner, so that a voltage for achieving image display is applied to the common electrodes in an image display stage and a touch driving voltage is applied to the common electrodes so as to achieve a touch function in a touch display stage. For example, in the image display stage and the touch display stage, the voltage for achieving image display is applied to the permanent common electrodes by the common electrode wires 207.

For example, in the embodiments of the present disclosure, the touch driving electrode wires and the gate lines are arranged in the same layer. For example, the touch driving electrode wires and the gate lines are simultaneously formed by the same patterning process performed on the same metal film layer; thus, in the case that the touch driving electrode wires are formed, the number of patterning processes are not increased and production cost is not increased.

For example, in the embodiments of the present disclosure, the touch driving electrode connection wires and the pixel electrodes are arranged in the same layer. For example, the touch driving electrode connection wires and the pixel electrodes are simultaneously formed by the same patterning process performed on the same transparent conductive film layer; thus, in the case that the touch driving electrode connection wires are formed, the number of the pattering processes are not increased and production cost is not increased.

For example, as shown in FIG. 4, in the embodiments of the present disclosure, the touch driving electrode wires 202 are directly in contact with part of the touch driving electrode units 2012 of the touch driving electrode blocks 2011. Such direct contact reduces a connection resistance; and meanwhile, compared with the touch display panel shown in FIG. 1, such direct contact does not need to provide the via holes 15 shown in FIG. 1, so that production cost is reduced.

Figure 5:
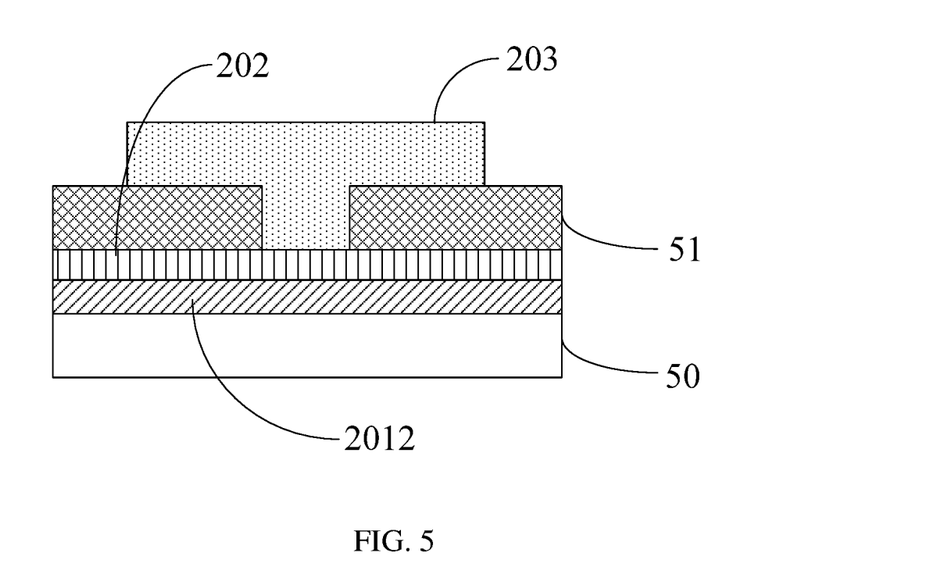
FIG. 5 is a structural schematic view illustrating a cross-section of a partial region in FIG. 4.

FIG. 5 is a structural schematic view illustrating a cross-section of a region 40 in FIG. 4. It can be seen from the diagram that in the embodiments of the present disclosure, the touch driving electrode units 2012 of the touch driving electrode blocks 2011 are directly arranged on the base substrate 50, and the touch driving electrode wires 202 are directly in contact with the touch driving electrode units 2012.

As shown in FIG. 4 and FIG. 5, in the embodiments of the present disclosure, the gate insulating layer and the passivation layer 51 are arranged between the touch driving electrode wires 202 and the touch driving electrode connection wires 203, the touch driving electrode connection wires 203 electrically connect the touch driving electrode units 2012 of the touch driving electrode blocks through via holes 41 running through the gate insulating layer and the passivation layer.

The embodiments of the present disclosure further provide a touch display apparatus. The touch display apparatus includes the touch display panel, and the touch display apparatus for example is a liquid crystal display, a liquid crystal television, an Organic Light Emitting Diode (OLED) panel, an OLED display, an OLED television, an electronic paper and the like.

A fabrication method of a touch display panel according to the embodiments of the present disclosure will be illustrated in connection with the drawings in the following.

Figure 6:
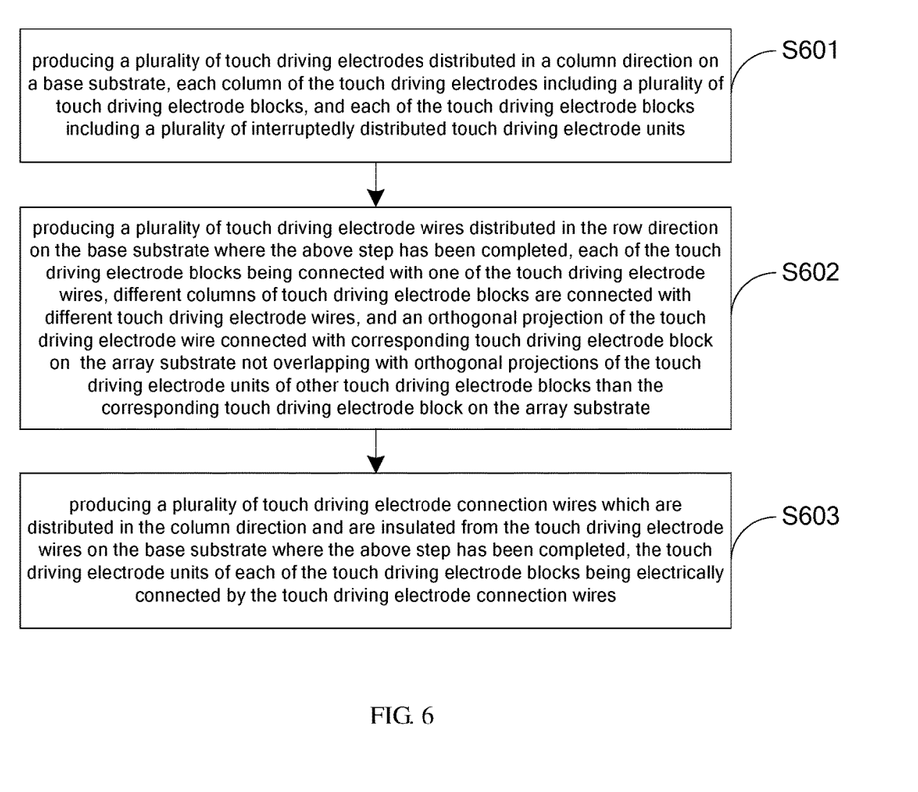
FIG. 6 is a flow chart of a method of fabricating an array substrate, which is included in a fabrication method of a touch display panel according to the embodiments of the present disclosure.

As shown in FIG. 6, the embodiments of the present disclosure further provide the fabrication method of the touch display panel, including a method of producing an array substrate and a method of producing an opposite substrate. For example, the method of producing the opposite substrate includes: producing a plurality of touch sensing electrodes distributed in a row direction on the opposite substrate. For example, the method of producing the array substrate includes:

S601: producing a plurality of touch driving electrodes distributed in a column direction on a base substrate, each column of the touch driving electrodes including a plurality of touch driving electrode blocks, and each of the touch driving electrode blocks including a plurality of interruptedly distributed touch driving electrode units;

S602: producing a plurality of touch driving electrode wires distributed in the row direction on the base substrate where the above step has been completed, each of the touch driving electrode blocks being connected with one of the touch driving electrode wires, different columns of touch driving electrode blocks are connected with different touch driving electrode wires, and an orthogonal projection of the touch driving electrode wire connected with corresponding touch driving electrode block on the array substrate not overlapping with orthogonal projections of the touch driving electrode units of other touch driving electrode blocks than the corresponding touch driving electrode block on the array substrate; and S603: producing a plurality of touch driving electrode connection wires which are distributed in the column direction and are insulated from the touch driving electrode wires on the base substrate where the above step has been completed, the touch driving electrode units of each of the touch driving electrode blocks being electrically connected by the touch driving electrode connection wires.

Figure 7:
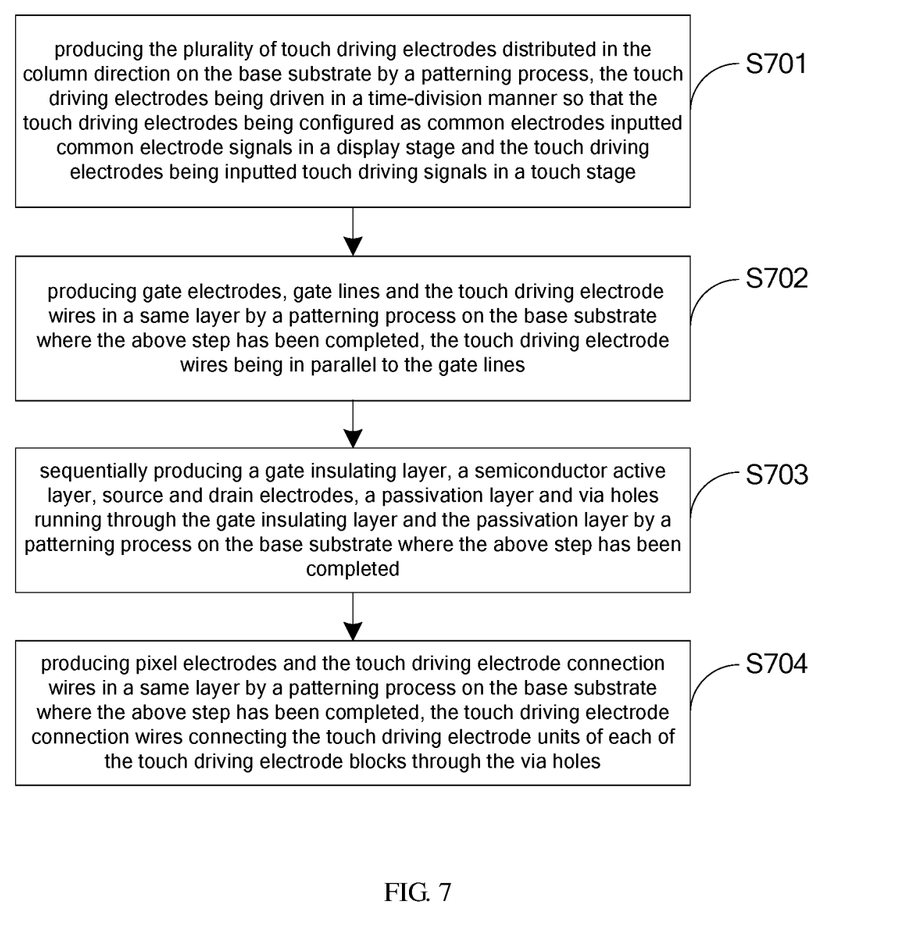
FIG. 7 is a flow chart of the method of fabricating the array substrate according to the embodiments of the present disclosure.

As shown in FIG. 7, the method of producing the array substrate according to the embodiments of the present disclosure includes:

S701: producing the plurality of touch driving electrodes distributed in the column direction on the base substrate by a patterning process, the touch driving electrodes being driven in a time-division manner so that the touch driving electrodes being configured as common electrodes inputted common electrode signals in a display stage and the touch driving electrodes being inputted touch driving signals in a touch stage;

S702: producing gate electrodes, gate lines and the touch driving electrode wires in a same layer by a patterning process on the base substrate where the above step has been completed, the touch driving electrode wires being in parallel to the gate lines;

S703: sequentially producing a gate insulating layer, a semiconductor active layer, source and drain electrodes, a passivation layer and via holes running through the gate insulating layer and the passivation layer by a patterning process on the base substrate where the above step has been completed; and S704: producing pixel electrodes and the touch driving electrode connection wires in a same layer by a patterning process on the base substrate where the above step has been completed, the touch driving electrode connection wires connecting the touch driving electrode units of each of the touch driving electrode blocks through the via holes.

For example, with reference to FIG. 4 and FIG. 5, according to the embodiments of the present disclosure, firstly, a transparent conductive thin film is deposited on the base substrate 50, then the transparent conductive thin film is patterned by the patterning process to form the touch driving electrodes, and each column of touch driving electrodes include the plurality of touch driving electrode blocks 2011, and each touch driving electrode block 2011 includes the plurality of interruptedly distributed touch driving electrode units 2012. In the embodiments of the present disclosure, the deposited transparent conductive thin film for example is an Indium Tin Oxide (ITO) thin film, an Indium Zinc Oxide (IZO) thin film, a composite thin film of ITO and IZO and the like. In the embodiments of the present disclosure, the patterning process for example includes part or all of processes of coating photoresist, exposure, development, etching and removing the photoresist after etching.

Then, with reference to FIG. 4 and FIG. 5, according to the embodiments of the present disclosure, a metal layer is deposited on the base substrate where the above step has been completed, and then the metal layer is processed by adopting the patterning process to form the gate electrode (not shown), the gate lines (not shown) and the touch driving electrode wires 202, and the touch driving electrode wires 202 are in parallel to the gate lines. In the embodiments of the present disclosure, the deposited metal layer for example is a single metal layer formed of Molybdenum (Mo), Aluminium (Al), Nickel (Ni) and the like, or a multiple metal layers formed of Molybdenum (Mo), Aluminium (Al), Nickel (Ni) and the like.

Then, with reference to FIG. 4, according to the embodiments of the present disclosure, the gate insulating layer (not shown), the semiconductor active layer (not shown), the source and drain electrodes (not shown), the passivation layer (not shown) and the via holes 41 running through the gate insulating layer and the passivation layer are formed on the base substrate where the above step has been completed.

Then, with reference to FIG. 4 and FIG. 5, according to the embodiments of the present disclosure, a transparent conductive thin film is deposited on the base substrate where the above step has been completed, then the transparent conductive thin film is processed by adopting the patterning process to form the pixel electrodes (not shown) and the touch driving electrode connection wires 203. In each touch driving electrode block, the touch driving electrode connection wire 203 is connected with adjacent touch driving electrode units 2012 through the via holes 41. For example, according to the embodiments of the present disclosure, a material of the transparent conductive thin film for forming the pixel electrodes is the same as that of the transparent conductive thin film for forming the common electrodes. However, in the actual production process, the materials of the transparent conductive thin film for forming the pixel electrodes and the materials of the transparent conductive thin film for forming the common electrodes may be different, and the embodiments of the present disclosure do not limit the specific materials of the common electrodes and the pixel electrodes.

The embodiments of the present disclosure provide the touch display panel and the fabrication method thereof, and the touch display apparatus. The touch display panel comprises the array substrate and the opposite substrate which are arranged to face each other. The opposite substrate includes the plurality of touch sensing electrodes distributed in the row direction. The array substrate includes the plurality of touch driving electrodes distributed in the column direction, the plurality of touch driving electrode wires distributed in the row direction, and the plurality of touch driving electrode connection wires which are distributed in the column direction and are insulated from the touch driving electrode wires. Each column of touch driving electrodes include the plurality of touch driving electrode blocks, each of the touch driving electrode blocks is connected with one touch driving electrode wire, and different columns of touch driving electrode blocks are connected with different touch driving electrode wires. Each of the touch driving electrode blocks includes the plurality of interruptedly distributed touch driving electrode units, and the touch driving electrode units of each of the touch driving electrode blocks are electrically connected by the touch driving electrode connection wires. The orthogonal projection of the touch driving electrode wire connected with corresponding touch driving electrode block on the array substrate does not overlap with the orthogonal projections of the touch driving electrode units of other touch driving electrode blocks than the corresponding touch driving electrode block on the array substrate. In the embodiments of the disclosure, the orthogonal projection of the touch driving electrode wire connected with corresponding touch driving electrode block on the array substrate does not overlap with the orthogonal projections of the touch driving electrode units of other touch driving electrode blocks than the corresponding touch driving electrode block on the array substrate; thus, compared with the touch display panel shown in FIG. 1, the touch driving electrode wires of the inside touch driving electrodes in the embodiments of the present disclosure do not cross the touch driving electrode units having large areas of the outside touch driving electrodes. Thus, in the embodiments of the present disclosure, in the case that the inside touch driving electrodes are subjected to touch scanning, the inside touch driving electrodes generate a lower crosstalk on the outside touch driving electrodes, so that the touch effect of the touch display panel is improved.

The foregoing embodiments merely are exemplary embodiments of the disclosure, and not intended to define the scope of the disclosure, and the scope of the disclosure is determined by the appended claims.

The application claims priority of Chinese Patent Application No. 201510400775.2 filed on Jul. 9, 2015, the disclosure of which is incorporated herein by reference in its entirety as part of the present application.

The invention claimed is:

1. A touch display panel, comprising an array substrate and an opposite substrate which are arranged to face each other, the opposite substrate including a plurality of touch sensing electrodes distributed in a row direction, wherein,
the array substrate includes a plurality of touch driving electrodes distributed in a column direction, a plurality of touch driving electrode wires distributed in the row direction, and a plurality of touch driving electrode connection wires which are distributed in the column direction and are insulated from the touch driving electrode wires;
each column of touch driving electrodes include a plurality of touch driving electrode blocks, each of the touch driving electrode blocks is connected with one touch driving electrode wire, and different columns of touch driving electrode blocks are connected with different touch driving electrode wires;
each of the touch driving electrode blocks includes a plurality of interruptedly distributed touch driving electrode units, and the touch driving electrode units of each of the touch driving electrode blocks are electrically connected by the touch driving electrode connection wires; and
an orthogonal projection of the touch driving electrode wire connected with corresponding touch driving electrode block on the array substrate does not overlap with orthogonal projections of the touch driving electrode units of the touch driving electrode blocks other than the corresponding touch driving electrode block on the array substrate.

2. The touch display panel according to claim 1, wherein, the array substrate includes a base substrate, and the touch driving electrodes, gate lines, a gate insulating layer, a semiconductor active layer, source and drain electrodes, a passivation layer and pixel electrodes which are sequentially positioned on the base substrate; and
the touch driving electrodes are driven in a time-division manner, so that the touch driving electrodes are configured as common electrodes inputted common electrode signals in a display stage and the touch driving electrodes are inputted touch driving signals in a touch stage.

3. The touch display panel according to claim 2, wherein, the touch driving electrode wires and the gate lines are provided in a same layer.

4. The touch display panel according to claim 3, wherein, each of the touch driving electrode blocks is connected with one touch driving electrode wire, which includes:
part of the touch driving electrode units of each of the touch driving electrode blocks is directly in contact with one of the touch driving electrode wires.

5. The touch display panel according to claim 2, wherein, the touch driving electrode connection wires and the pixel electrodes are provided in a same layer.

6. The touch display panel according to claim 5, wherein, the touch driving electrode units of each of the touch driving electrode blocks are electrically connected by the touch driving electrode connection wires, which includes:
the touch driving electrode connection wires electrically connect the touch driving electrode units of each of the touch driving electrode blocks through via holes running through the gate insulating layer and the passivation layer.

7. The touch display panel according to claim 1, wherein, the touch driving electrode units of each column of the touch driving electrode blocks are same in size.

8. The touch display panel according to claim 7, wherein, the touch driving electrode units of different columns of the touch driving electrode blocks are same in size.

9. A touch display apparatus, comprising the touch display panel according to claim 1.

10. A fabrication method of a touch display panel, comprising a method of producing an array substrate and a method of producing an opposite substrate, wherein,
the method of producing the opposite substrate includes:
producing a plurality of touch sensing electrodes distributed in a row direction on the opposite substrate; and
the method of producing the array substrate includes:
producing a plurality of touch driving electrodes distributed in a column direction on a base substrate, each column of the touch driving electrodes including a plurality of touch driving electrode blocks, and each of the touch driving electrode blocks including a plurality of interruptedly distributed touch driving electrode units;
producing a plurality of touch driving electrode wires distributed in the row direction on the base substrate, each of the touch driving electrode blocks being connected with one of the touch driving electrode wires, different columns of touch driving electrode blocks are connected with different touch driving electrode wires, and an orthogonal projection of the touch driving electrode wire connected with corresponding touch driving electrode block on the array substrate not overlapping with orthogonal projections of the touch driving electrode units of the touch driving electrode blocks other than the corresponding touch driving electrode block on the array substrate; and
producing a plurality of touch driving electrode connection wires which are distributed in the column direction and are insulated from the touch driving electrode wires on the base substrate, the touch driving electrode units of each of the touch driving electrode blocks being electrically connected by the touch driving electrode connection wires.

11. The method according to claim 10, wherein, the method of producing the array substrate includes:
producing the plurality of touch driving electrodes distributed in the column direction on the base substrate by a patterning process, the touch driving electrodes being driven in a time-division manner so that the touch driving electrodes being configured as common electrodes inputted common electrode signals in a display stage and the touch driving electrodes being inputted touch driving signals in a touch stage;
producing gate electrodes, gate lines and the touch driving electrode wires in a same layer by a patterning process on the base substrate, the touch driving electrode wires being in parallel to the gate lines;

sequentially producing a gate insulating layer, a semiconductor active layer, source and drain electrodes, a passivation layer and via holes running through the gate insulating layer and the passivation layer by a patterning process on the base substrate; and producing pixel electrodes and the touch driving electrode connection wires in a same layer by a patterning process on the base substrate, the touch driving electrode connection wires connecting the touch driving electrode units of each of the touch driving electrode blocks through the via holes.

12. The touch display panel according to claim 3, wherein, the touch driving electrode connection wires and the pixel electrodes are provided in a same layer.

13. The touch display panel according to claim 4, wherein, the touch driving electrode connection wires and the pixel electrodes are provided in a same layer.

14. The touch display panel according to claim 1, wherein, lengths of different touch driving electrode wires in the row direction are unequal.

15. The touch display panel according to claim 1, wherein, each column of touch driving electrode blocks includes one column of touch driving electrode units interruptedly distributed in the column direction.

16. The touch display panel according to claim 1, wherein, each column of touch driving electrode blocks includes more than one column of touch driving electrode units interruptedly distributed in the column direction.

* * * * *